United States Patent
O'Keeffe et al.

(10) Patent No.: US 10,003,413 B2
(45) Date of Patent: Jun. 19, 2018

(54) NETWORK ELEMENT, INTEGRATED CIRCUIT AND METHOD OF DETERMINING CONNECTIVITY FROM ANTENNA ELEMENTS TO TRANSCEIVER LINE-UPS

(71) Applicant: Analog Devices Global, Hamilton (BM)

(72) Inventors: Conor O'Keeffe, Passage West (IE); Alex Brophy, Youghal (IE)

(73) Assignee: Analog Devices Global, Hamilton (BM)

( * ) Notice: Subject to any disclaimer, the term of this patent is extended or adjusted under 35 U.S.C. 154(b) by 0 days. days.

(21) Appl. No.: 14/897,602

(22) PCT Filed: Jun. 5, 2014

(86) PCT No.: PCT/EP2014/061686
§ 371 (c)(1),
(2) Date: Dec. 10, 2015

(87) PCT Pub. No.: WO2014/198624
PCT Pub. Date: Dec. 18, 2014

(65) Prior Publication Data
US 2016/0142124 A1    May 19, 2016

(30) Foreign Application Priority Data
Jun. 12, 2013 (GB) .................................. 1310435.1

(51) Int. Cl.
*H04B 17/00* (2015.01)
*H04B 17/10* (2015.01)
(Continued)

(52) U.S. Cl.
CPC ....... *H04B 17/0085* (2013.01); *H04B 7/0639* (2013.01); *H04B 17/10* (2015.01);
(Continued)

(58) Field of Classification Search
CPC .. H04B 7/0639; H04B 17/10; H04B 17/0085; H04B 17/19; H04B 7/04; H04L 5/0053
See application file for complete search history.

(56) References Cited

U.S. PATENT DOCUMENTS

| 4,924,235 A | 5/1990 | Fujisaka et al. |
| 5,548,820 A * | 8/1996 | Victorin ................ H04W 24/00 343/703 |

(Continued)

FOREIGN PATENT DOCUMENTS

| EP | 1289169 | 10/2005 |
| GB | 2356096 | 5/2001 |

(Continued)

OTHER PUBLICATIONS

International Search Report and Written Opinion for International Application No. PCT/EP2014/061686, Notification dated Oct. 28, 2014, 17 pages.

(Continued)

*Primary Examiner* — Gennadiy Tsvey
(74) *Attorney, Agent, or Firm* — Knobbe, Martens, Olson & Bear, LLP

(57) ABSTRACT

A method for assigning, in a database, a relationship between at least one logical channel and at least one antenna element feed that is coupleable to at least one antenna element of an antenna arrangement, is described. The method comprises either: applying a first signal to at least one first logical channel; and detecting whether there is a presence of a radio frequency signal converted from the first signal on at least one first antenna element feed; or applying a second signal to at least one first antenna element feed coupleable to at least one first antenna element of the antenna arrangement; and detecting whether there is a presence of a logical signal converted from the second signal on at least one first logical channel. The method further (Continued)

comprises assigning in the database in response thereto a relationship between the at least one first logical channel and the at least one first antenna element feed. This advantageously allows assigning of logical channels via a plurality of transceivers to a plurality of antenna elements. Furthermore, a logical channel to beamform coefficient assignment may be determined for the antenna array.

25 Claims, 8 Drawing Sheets

(51) Int. Cl.
- H04B 7/06 (2006.01)
- H04L 5/00 (2006.01)
- H04B 7/04 (2017.01)
- H04B 17/19 (2015.01)

(52) U.S. Cl.
CPC .............. *H04L 5/0053* (2013.01); *H04B 7/04* (2013.01); *H04B 17/19* (2015.01)

(56) References Cited

U.S. PATENT DOCUMENTS

| | | | |
|---|---|---|---|
| 6,952,455 | B1 | 10/2005 | Banister |
| 7,212,383 | B2 | 5/2007 | Hasegawa et al. |
| 7,898,392 | B2* | 3/2011 | Mochizuki ........... G06K 7/0008 340/10.3 |
| 8,265,572 | B2 | 9/2012 | Kenington |
| 2004/0185904 | A1* | 9/2004 | Yamakita ............. H04B 7/0608 455/560 |
| 2006/0145884 | A1* | 7/2006 | Graham ................. H01Q 3/267 340/687 |
| 2007/0190951 | A1 | 8/2007 | Lampinen et al. |
| 2008/0129643 | A1* | 6/2008 | Itoh .................... G06K 7/10346 343/878 |
| 2008/0261551 | A1* | 10/2008 | Catreux-Erceg ..... H04B 7/0615 455/272 |
| 2009/0264119 | A1* | 10/2009 | De Pomian ........... H04W 24/08 455/424 |
| 2010/0093282 | A1* | 4/2010 | Martikkala ............ H04B 17/14 455/63.4 |
| 2010/0120415 | A1* | 5/2010 | Urquhart .............. H01Q 1/1257 455/424 |
| 2010/0142321 | A1 | 6/2010 | Chang et al. |
| 2011/0013581 | A1 | 1/2011 | Lee et al. |
| 2011/0038333 | A1 | 2/2011 | Yi et al. |
| 2012/0064838 | A1 | 3/2012 | Miao et al. |
| 2012/0083317 | A1* | 4/2012 | Athley ..................... H04B 7/04 455/562.1 |
| 2012/0087450 | A1* | 4/2012 | Coldrey ................. H01Q 21/06 375/346 |
| 2013/0016647 | A1 | 1/2013 | Marco et al. |
| 2013/0120191 | A1* | 5/2013 | Zhang .................. H04B 7/0469 342/377 |
| 2013/0210368 | A1* | 8/2013 | Lee ....................... H04B 17/102 455/67.11 |
| 2013/0215876 | A1* | 8/2013 | Santos ................... H01Q 1/246 370/338 |
| 2013/0273921 | A1* | 10/2013 | Kenington ............ H04W 16/18 455/446 |
| 2014/0002316 | A1* | 1/2014 | Liu ........................ G01R 31/04 343/703 |
| 2014/0141728 | A1* | 5/2014 | Devarasetty ........... H04B 17/18 455/67.14 |
| 2016/0226601 | A1* | 8/2016 | Hu ........................... H04B 7/06 |

FOREIGN PATENT DOCUMENTS

| | | | |
|---|---|---|---|
| GB | 2476252 | 6/2011 | |
| WO | WO 2004/057758 | 7/2004 | |
| WO | WO 2008023097 A1 * | 2/2008 | ......... H04B 17/0085 |
| WO | WO 2010/142321 | 12/2010 | |

OTHER PUBLICATIONS

International Preliminary Report on Patentability for International Application No. PCT/EP2014/061686 dated Dec. 15, 2015, 11 pages.
Combined Search and Examination Report for GB App. No. 1310435.1 dated Nov. 12, 2013, 5 pages.
Examination Report of UK Intellectual Property Office for Application No. GB1310435.1, dated Jun. 28, 2016, 4 pages.
Examination Report of UK Intellectual Property Office for Application No. GB1310435.1, dated Jun. 13, 2017, 5 pages.

* cited by examiner

NETWORK ELEMENT, INTEGRATED CIRCUIT AND METHOD OF DETERMINING CONNECTIVITY FROM ANTENNA ELEMENTS TO TRANSCEIVER LINE-UPS

This application is a national stage application of International Patent Application No. PCT/EP2014/061686, filed on Jun. 5, 2014, which claims priority to GB Application No. 1310435.1, filed Jun. 12, 2013, titled NETWORK ELEMENT, INTEGRATED CIRCUIT AND METHOD OF ASSIGNING CHANNELS.

FIELD OF THE INVENTION

The field of the invention relates to an antenna array for a network element and an integrated circuit therefor. The field of the invention is applicable to, but not limited to, a mechanism for logical channel to physical channel assigning for an antenna array.

BACKGROUND OF THE INVENTION

Conventional antenna arrays for wireless communication systems comprise multiple antenna elements. The antenna arrays are often used with existing Node-B equipment in most cellular installations and utilise a fixed 65° beam pattern. Outside of the main lobe of the antenna beam the signals are spatially filtered and significantly attenuated. Conventional network planning and passive antenna array solutions process all incoming signals with a common fixed beam pattern. Such receive processing, based on signals received within the geographic area identified by the antenna beam main lobe, referred to as the RF footprint, tends to dictate a corresponding common beam pattern for transmitter operation. Thus, an identical radio frequency (RF) footprint is used for both receive (Rx) and transmit (Tx) operation.

Receive beam-forming using antenna arrays depends on the ability to constructively add incident signals on each of the antenna elements in a way that coherently adds those from the desired direction. Thus, incident signals that are not from the desired direction will be incoherently added, and thus will not experience the same processing gain. The term 'coherency' implies that the signals will have substantially the same phase angle. In addition, thermal noise from multiple sources also exhibits incoherent properties, and thus when added the signals from multiple sources do not experience the same processing gain as a coherent desired signal. Conversely in transmit active antenna arrays the signals are coherently combined within the intended beam pattern as electromagnetic (EM) signals in the 'air' so that they arrive coherently at the mobile station (MS) (e.g. user equipment (UE) in third generation partnership project (3GPP™) parlance) receiver.

In the examples herein described, an antenna element is a radiative structure whose purpose is to convert electromagnetic (EM) signals to electrical signals, or vice versa, in which a singular element has a fixed radiation pattern. The term 'radiative elements' described herein refers to elements capable of radiating an electromagnetic signal. Furthermore, the term 'radiative elements' described herein also encompasses structures capable of absorbing EM radiation and converting to electrical signals. These elements, constructed as an array can be configured to have various radiation patterns by manipulation of electrical signals coupled to the elements. Thus, the ability to alter the radiative beam shape may be achieved.

For completeness, it is worth clarifying the Antenna Reciprocity Theorem, which in classical treatises on electromagnetic fields and antennas is usually formulated as follows:

Given two antennas 'A' and 'B' placed at some distance apart, each of them may be operated either as a transmitting antenna or as a receiving antenna. Suppose that antenna 'B' is kept intact, whilst the performance of antenna 'A' as a transmitter is modified. A consequence of this is that, for a fixed amount of input power, the signal received by antenna 'B' changes by a factor 'F' due to the change imposed on antenna 'A'. Then the same modification changes also the performance of antenna 'A' as a receiver and does so by the same factor 'F'. The theorem follows from certain symmetries of Maxwell equations and its validity is easily verified experimentally and has been widely published. Hence, the radiation pattern induced by a transmitter operably coupled to an antenna with same carrier frequency as a receiver has identical azimuthal angular link loss. Thus, the term radiative and 'radiative beam pattern' hereinafter may also be applied to a receiver.

An active antenna system (AAS) is a group of antennas emitting signals to produce a directive radiation pattern. Each antenna element is connected to a radio transceiver. The radiation pattern of the array can be controlled by configuring the relative phases and amplitudes of the respective signals at each AAS antenna element. By precisely controlling relative phases and amplitudes of processed signals prior to be being combined, it is possible to align peaks and nulls in the radiated signals to form a beam, a process referred to hereafter as 'beamforming'.

The phase and amplitude of the signal on a given antenna element is controlled by adjustments within the transceiver. Following installation, and particularly following re-configuration of radio frequency equipment and/or circuits, it is therefore important to know which radio transceiver is connected to which antenna element. Furthermore, a transceiver may be composed of multiple elements, such as Power Amplifier (PA) devices.

In an antenna element array, the number of possible connectivity paths of the antenna elements to the radio transceiver line-ups may be defined as:

$$N_{element} \times (M_1! - (M_1 - N_{element})!) \times \ldots \times (M_n! - (M_n - N_{element})!) \times L \quad [1]$$

where:
- $N_{element}$ is the number of used antenna elements in the system;
- $M_1$ is the number of paths through the $1^{st}$ multipath switch;
- $M_n$ is the number of paths through the $n^{th}$ multipath switch; and
- L is the number of used radio transceiver line-ups in the system.

The number of possible paths therefore rises exponentially as the number of multipath switches and paths through each multipath switch increases. If the routing through the system is not as expected for one or more of the antenna elements then the system performance is, at a minimum, degraded and may be, in a worst case scenario, completely non-functional in its beamforming capability. Thus, it is important to know which PA from which transceiver is connected to which antenna element.

Typically, this imposes restrictions on the AAS manufacture and assembly process such that connectivity must be predetermined and the assembly proceeds according to a somewhat inflexible predetermined connectivity.

There may also be a need to account for additional switching elements across the various antenna elements to logical channel paths. Furthermore, there may be a need for dynamic selection of the number of antenna elements that are connected to transceiver radio line-ups for a given configuration of the array.

U.S. Pat. No. 8,265,572 B2 discloses a multiple envelope tracking system for an active antenna array where the premise is that the logical channel routing to individual antenna elements is known and fixed. There is no disclosure of any mechanism by which an antenna array is able to detect the logical to physical element signal routing.

Both U.S. Pat. No. 7,212,838 and U.S. Pat. No. 6,952,455 specifies a method for adapting beam weightings to increase received signal power levels in a system. This receive-only method does not rely on or establish the connectivity between antennas and logical channels in the transmitter or receiver. Moreso, application of this method would interfere with the control of beam direction, as the resultant beam would always be biased towards the highest power source (blind adaptation) rather than intended direction, and beam shapes in general would be unpredictable.

Thus, there is currently no known method of dynamically establishing connectivity between antennas and logical channels in a transmitter or receiver.

SUMMARY OF THE INVENTION

Accordingly, the invention seeks to mitigate, alleviate or eliminate one or more of the above mentioned disadvantages singly or in any combination.

According to a first aspect of the invention, a method for assigning, in a database, a relationship between at least one logical channel and at least one antenna element feed that is coupleable to at least one antenna element of an antenna arrangement, is described. The method comprises either: applying a first signal to at least one first logical channel; and detecting whether there is a presence of a radio frequency signal converted from the first signal on at least one first antenna element feed; or applying a second signal to at least one first antenna element feed coupleable to at least one first antenna element of the antenna arrangement; and detecting whether there is a presence of a logical signal converted from the second signal on at least one first logical channel. The method further comprises assigning in the database in response thereto a relationship between the at least one first logical channel and the at least one first antenna element feed. This advantageously allows assigning of logical channels via a plurality of transceivers to a plurality of antenna elements. Furthermore, a logical channel to beamform coefficient assignment may be determined for the active antenna array.

According to an optional example embodiment of the invention the method may further comprise, either: converting the first signal applied to the at least one first logical channel to the radio frequency signal; and applying the radio frequency signal to the at least one first antenna element feed; or converting the second signal applied to the at least one first antenna element feed to the logical signal; and applying the logical signal to the at least one first logical channel.

According to an optional example embodiment of the invention, the method may comprise routing the second signal via at least one circuit element supporting a physical channel from a plurality of physical channels; detecting a presence of the second signal on at least one first circuit element from a plurality of circuit elements; and assigning in the database a relationship between the at least one first circuit element and at least one of: the at least one first logical channel, the at least one first antenna element feed.

According to an optional example embodiment of the invention, converting a signal may comprise performing at least one from a group of: an up-conversion process, a down-conversion process, a digital to analog conversion process, an analog to digital signal processing process, a power amplification process, a switching process.

According to an optional example embodiment of the invention, in response to no detection of the presence of the logical signal on the at least one first logical channel: the method may further comprise iteratively detecting whether there is a presence of the logical signal on at least one further logical channel of a plurality of logical channels; and assigning in the database, in response to a positive detection, a relationship between the at least one first antenna element feed and the detected at least one further logical channel.

According to an optional example embodiment of the invention, the method may further comprise, in response to no detection of the presence of the radio frequency signal converted from the first signal on the at least one first antenna element feed: iteratively detecting whether there is a presence of the radio frequency signal on at least one further antenna element feed of a plurality of antenna element feeds; and assigning in the database, in response to a positive detection, a relationship between the at least one first logical channel and the detected at least one further antenna element feed.

According to an optional example embodiment of the invention, applying, detecting and assigning may be performed automatically in detecting a routing configuration between the antenna arrangement and plurality of logical channels, thereby advantageously allowing assigning of the various elements and channels to be automatically achieved. In one example this may form part of a self-test program for an active antenna array system.

According to an optional example embodiment of the invention, the method may further comprise failing to detect the second signal on any antenna element feed after applying the logical signal to the at least one first logical channel; and in response thereto identifying the at least one first logical channel as being unconnected to any antenna element feed; or failing to detect the first signal on any logical channel after applying the radio frequency signal to the at least one first antenna element feed; and in response thereto identifying the at least one first antenna element feed as being unconnected to any logical channel. In this manner, the method may advantageously identify non-functional components or circuits or an unconnected antenna element of physical or logical channel.

According to an optional example embodiment of the invention, the method may further comprise, in response to identifying that logical channel as being unconnected to any antenna element, implementing at least one of: a re-configuration routine of the active antenna array; raising an alarm associated with the identified logical channel; reporting of a failure. In this manner, non-functional components or circuits may be identified and corrected quickly.

According to an optional example embodiment of the invention, upon assigning in the database the relationships between a plurality of antenna element feeds and a plurality of logical channels, the method may further comprise determining at least one of: an array size for an antenna array, an array shape for the antenna array, thereby advantageously allowing an array size to be determined and the antenna arrangement to be configured as a particular array shape in response thereto.

According to an optional example embodiment of the invention, the method may further comprise extracting assigning information from the database, and using the assigning information to apply beam weightings to logical channels in order to form a desired beam of the antenna arrangement.

According to an optional example embodiment of the invention, more than one logical channel is assigned to an individual antenna element feed when supporting multicarrier operation.

According to an optional example embodiment of the invention, the at least one first signal may be a transmit pilot signal.

According to a second aspect of the invention, a computer program product comprises program code for assigning in a database a relationship between at least one logical channel and at least one antenna element feed coupleable to at least one antenna element of an antenna arrangement, the computer program product comprising program code operable for, when executed at a network element, performing the method of the first aspect.

According to a third aspect of the invention, a network element comprises an antenna arrangement comprising a plurality of antenna element feeds, a plurality of radio frequency circuits supporting a plurality of physical channels and a plurality of logical channels connectable thereto: an interface for coupling the plurality of antenna element feeds to the plurality of radio frequency circuits. A signal processor is arranged to either: apply a first signal to at least one first logical channel; and detect whether there is a presence of a radio frequency signal converted from the first signal on at least one first antenna element feed or apply a second signal to at least one first antenna element feed coupleable to at least one first antenna element of the antenna arrangement; and detect whether there is a presence of a logical signal converted from the second signal on at least one first logical channel. The signal processor is further arranged to assign in the database, in response thereto, a relationship between the at least one first logical channel and the at least one first antenna element feed.

According to a fourth aspect of the invention, a method for reconfiguring an antenna arrangement comprising a plurality of antenna element feeds, a plurality of radio frequency circuits supporting a plurality of physical channels and a plurality of logical channels connectable thereto, is described. The method comprises: receiving a request to reconfigure the antenna arrangement; accessing a database comprising relationships between the plurality of logical channels and the plurality of antenna element feeds; determining from the database information relating to at least one first antenna element feed and at least one first logical channel; and reconfiguring the antenna arrangement in response thereto by connecting the at least one logical channel to the at least one first antenna element feed via at least one physical channel from a plurality of physical channels.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Embodiments of the invention are described with reference to smart (or active) antenna technology, sometimes referred to as Active Antenna Systems (AAS), used in a wireless communication system. For the purpose of simplicity the following description will be explained with regard to a network element being an AAS. Smart (or active) antenna technology is a radio technology where the antenna system comprises dedicated signal processing logic per antenna array element. Alternative embodiments may be employed in co-located antenna and signal processing units. Smart (active) antenna technologies fall into three broad families, namely: (i) multi-antenna systems (MAS); (ii) radiohead implementations with or without multiple in-multiple out (MIMO) radio ports; and (iii) active antenna systems. AAS systems are characterised by including all the RF signal electronic processing inside the antenna radome, the enclosure also housing the antenna elements of the array.

The following description focuses on embodiments of the invention that are applicable to active antenna arrays employed in Universal Mobile Telecommunication System (UMTS™) cellular communication systems and in particular to a UMTS Terrestrial Radio Access Network (UTRAN) operating in a $3^{rd}$ generation partnership project (3GPP™) system, and evolutions to this standard such as HSPA+ and LTE. However, it will be appreciated that the invention is not limited to this particular cellular communication system, but may be applied to any wireless communication system, including terrestrial broadcast, communications ground base stations and radar arrays and satellite communication systems that employ antenna arrangements.

Examples of the invention are described with reference to a method and apparatus that determine a complete connectivity through the system from antenna elements to transceiver line-ups, thereby removing the need to pre-determine the connectivity at design and assembly.

Figure 1:
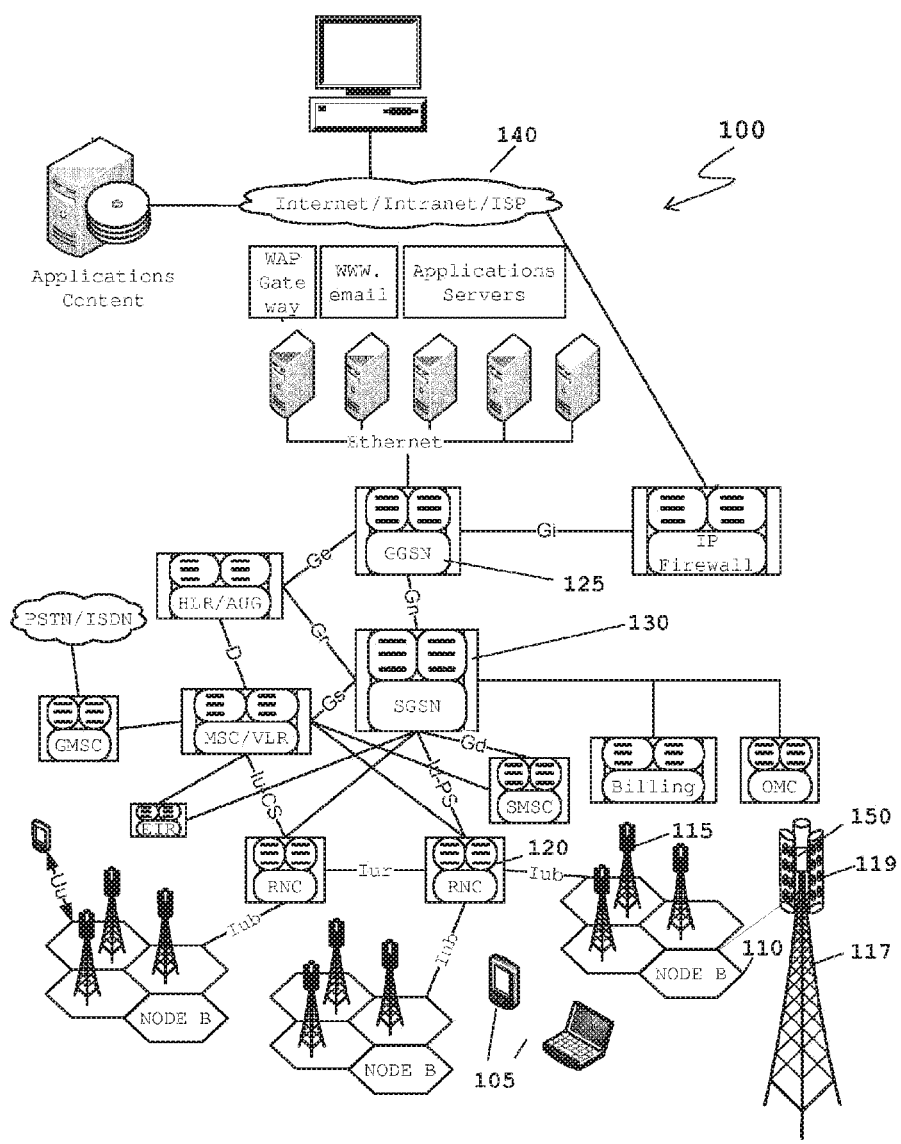
FIG. 1 illustrates an example of a 3GPP™ cellular communication system adapted in accordance with some embodiments of the invention.

Referring now to FIG. 1, a cellular-based communication system 100 is shown in outline, in accordance with one example embodiment of the invention. In this embodiment, the cellular-based communication system 100 is compliant with, and contains network elements capable of operating over, an universal mobile telecommunication system (UMTS™) air-interface or any evolution of said air interface access method.

A plurality of wireless subscriber communication units/terminals (or user equipment (UE) in UMTS™ nomenclature) 105 communicate over radio links with a plurality of base transceiver stations, referred to under UMTS™ terminology as Node-Bs, 115 supporting communication coverage over a particular communication cell 110. The system 100 comprises many other UEs and Node-Bs, which for clarity purposes are not shown.

The wireless communication system, sometimes referred to as a Network Operator's Network Domain, is connected to an external network 140, for example the Internet. The Network Operator's Network Domain includes:

(i) A core network, namely at least one Gateway General Packet Radio System (GPRS) Support Node (GGSN) 125 and at least one Serving GPRS Support Nodes (SGSN) 130; and (ii) An access network, comprising a UMTS Radio network controller (RNC) 120; and at least one UMTS Node-B 115, where each RNC 120 may control one or more Node-Bs 115.

The GGSN 125 or SGSN 130 is responsible for UMTS interfacing with a Public network, for example a Public Switched Data Network (PSDN) (such as the Internet) 140 or a Public Switched Telephone Network (PSTN). The SGSN 130 performs a routing and tunneling function for traffic, whilst a GGSN 125 links to external packet networks. Each SGSN 130 provides a gateway to the external network 140. The Operations and Management Centre (OMC) is operably connected to RNCs 120 and Node-Bs 115. The OMC comprises processing functions and logic functionality in order to administer and manage sections of the cellular communication system 100, as is understood by those skilled in the art.

The Node-Bs 115 are connected to external networks, through Radio Network Controller (RNC) stations, including RNC 120 and mobile switching centres (MSCs), such as SGSN 130. A cellular communication system will typically have a large number of such infrastructure elements where, for clarity purposes, only a limited number are shown in FIG. 1.

Each Node-B 115 contains one or more transceiver units and communicates with the rest of the cell-based system infrastructure via an $I_{ub}$ interface, as defined in the UMTS™ specification. Each Node-B 115 is operably coupled to an antenna mast 117 for transmitting and receiving signals to/from remote UEs, where each antenna mast 117 comprises an antenna array 119 adapted in accordance with embodiments of the invention.

In accordance with example embodiments of the invention, active array technology is employed in the cellular communication system 100. In contrast to the known art, embodiments of the invention provide a communication unit in a form of a system control device 150, for example to be located between a Node B 115 and the antenna array 119. In the illustrated example, the system control device 150 is located on the antenna mast 117. The system control device 150 in a form of a network element is configured to apply one or more signals (e.g. a test signal) iteratively through each of the logical channels and execute an algorithm to detect the coupled signal at a sensed point of an antenna array corresponding to a known physical location and/or polarisation. The system control device 150 then determines the logical channel that registers a positive detection of the signal and stores at least one value(s) in a database assigning the detected logical channel to a determined antenna element. In one example, the process is iteratively performed for each antenna element feed until, say, the assigning database of a plurality of detected logical channels to corresponding antenna elements is fully populated. Each antenna element may have more than one feed as exemplified by cross polarisation antenna elements where each feed constitutes a different polarisation from the same antenna element.

In examples of the invention, the system control device 150 network element comprises an antenna arrangement comprising a plurality of antenna elements, a plurality of radio frequency circuits supporting a plurality of physical channels and a plurality of logical channels connectable thereto. The system control device 150/network element comprises an interface for coupling the plurality of antenna element feeds to the plurality of radio frequency circuits; and a signal processor arranged to: apply at least one signal to at least one first antenna element of the antenna arrangement; detect whether there is a presence of the at least one signal on at least one first logical channel; and assign in a database in response thereto a connection between the at least one first antenna element feed and the at least one first logical channel.

In one example embodiment of the invention, a switched coupler network is used to support assigning of logical radio paths to physical paths, for example by routing of different signals between logical channels and to/from respective antenna elements, for example within an antenna array. In this context, a logical channel may be considered as encompassing a digital data source targeted to a predefined destination that may be transported with other logical channels in a distribution medium, such as a serial interconnect. In one example, a logical channel may be time division multiplexed (TDM) with other logical channels in the transport medium or may be transported in adjacent data buses. In one example, all logical channels may have assigned destinations that can be performed via a tagging of the data or by means of its sequence number in a time division multiplex (TDM) frame. In one example, a physical path may be considered as encompassing an electrical or optical connection on a printed circuit board (PCB) or an integrated circuit (IC) or resides between PCB/antenna modules.

In this manner, a mechanism may be provided to better enable antenna array system configuration, manufacturing and test, for example by provision of automated detection of AAS path assigning. In some examples, the automatic applying, detecting and assigning operations described herein may form part of a self-test program for an active antenna array system.

Figure 2:
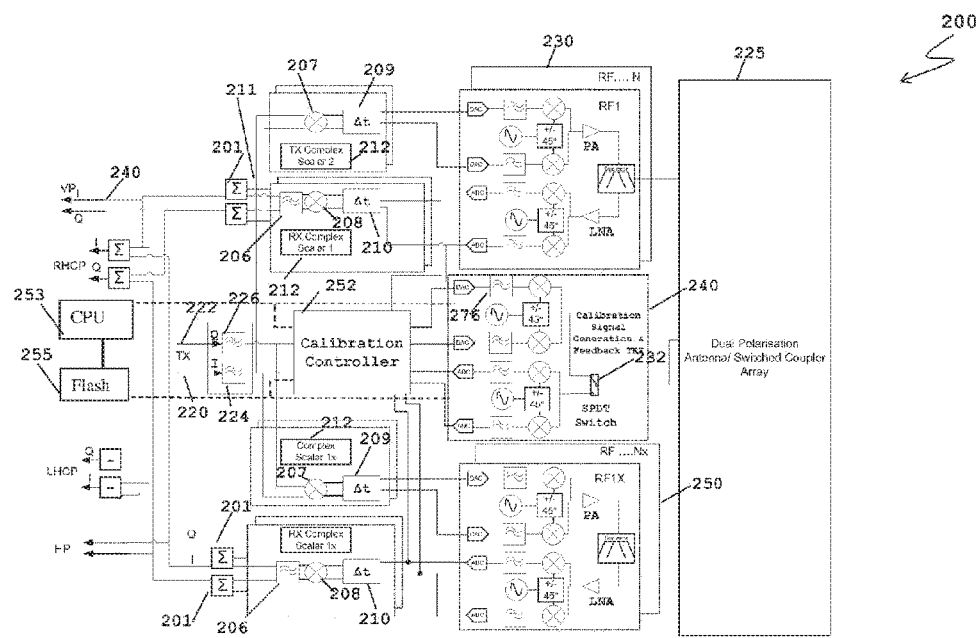
FIG. 2 illustrates an example of a part of a communication unit arranged to support multiple polarisation types using a transceiver antenna array.

Referring now to FIG. 2, an example of a part of a communication unit 200 is illustrated, where the communication unit 200 is arranged to support a plurality of transceivers 230, 240, 250 operably coupled to an antenna array and switched coupler arrangement 225. In FIG. 2, multiple pairs of antenna elements and antenna element feeds (not shown) are used in the antenna array, which can be additionally used to implement beamforming functionality. Beamforming is the generation of a desired radiation pattern emanating to and from the antenna array.

In FIG. 2, IQ sample pairs 220, 222 are input to the digital signal processing chain and filtered in low pass filters 224, 226 for each of the individual transmission paths, as well as providing a reference to the calibration controller 252. Complex scaling modules 207 apply one or more complex scalar values stored in one or more memory modules 212 to each of the respective 'I' and 'Q' pair baseband signals to accommodate for the polarisation type being used in the transmit operation. The complex scalar values stored in one or more memory modules 212 may comprise one or more beamform coefficient(s) and or one or more calibration correction coefficient(s) for the logical channel being processed. As such the assignment of the logical channel with its physical coupling in the array may be used to ensure that the correct coefficient(s) is/are applied for the particular physical feed to a particular antenna element of the array. The database in example embodiments may contain the address of the one or more memory modules 212 as assigned to a logical channel with the corresponding routing to a physical antenna element feed.

To skilled artisans it will be appreciated that more than one logical channel may be assigned to each element feed. For example, where more than one carrier frequency is processed by the AAS, each carrier will have a logical channel assignment per antenna element feed, where the same antenna element feeds are as used for other carriers.

The calibration controller 252 in accordance with examples of the invention may be under command of a supervisory microprocessor unit 253. The microprocessor unit 253 may be operably connected (not shown for clarity) to many circuit functions in the AAS in order to perform configure and control operations. The microprocessor unit 253 may also be used to manage the software command messages routed from the Node B baseband processor unit. The microprocessor unit 253 may also be operably connected to a non-volatile memory such as flash memory 255. In some examples, the flash memory 255 may be a separate integrated circuit to, or on the same monolithic integrated circuit, as the microprocessor unit 253. The flash memory 255 for example embodiments may be the location of the database of the logical channel to antenna feed assignments, as described herein.

A complex scalar (sometimes referred to as complex multiplier) consists of a module where for each complex IQ sample, the module multiplies the IQ sample by another complex term in a form, such as $\{(I+jQ) \times (Z+jY)\}$, where the resultant is another complex number. The letter T is used to denote the complex number operator. In this example, the signal output from a plurality of the receiver paths, following phase/amplitude/latency signal adjustment in configuration modules 206, 208, 210, together with subsequent beamforming processing, are added to form receive beams generated of one polarisation type, 240. Conversely, the other orthogonal linear polarisation type is generated in a similar fashion. If there is substantially a 90° offset phase offset relationship added to the scalar values stored in one or more memory modules 212 on one path versus the other, then left hand circular polarised (LHCP) and right hand circular polarised (RHCP) signals can be generated.

In a transmit sense, each of a plurality transmitter circuits of the transceiver circuits 230, 240, 250 comprise digital to analogue conversion modules to generate complex baseband analogue signals. The analogue signals are filtered and frequency translated to a desired RF band. A quadrature phase shifter ensures that the quadrature baseband signals are up-converted to radio frequency signals correctly. These RF signals are amplified in a power amplifier. Once amplified, the RF signals are routed to the antenna elements via a coupler structure 225, for example as described below in FIG. 3.

In receive mode, the logical channels of information are combined in summation units 201. Logical channel distribution in the network is denoted by the plurality of signals 211 and the plurality of signal to calibration correction modules 209, 210.

In some examples, it is envisaged that more than one logical channel may be assigned to an individual antenna element feed, for example when supporting multicarrier operation.

Digital signals received from the antenna as referenced in this disclosure are communicated to a baseband processor unit (not shown). The baseband processing unit completes the demodulation process of decoding the signals. In one example, a transport scheme is provided to communicate such information to a baseband processing unit. In a network element, such as in cellular infrastructure equipment, the transport scheme may be a CPRI or OBSAI RP3-01 link for interfacing to a baseband processing unit of a cellular base station, such as a 3GPP Node B. In this manner, an antenna array is able to be configured to have the same functionality of that described for a single element antenna.

Likewise, transmit signals are IQ sample signals output from the baseband processing unit to be used for transmission.

In this example, a calibration signal generation and calibration feedback detection transceiver circuitry 240 comprises a double pole double throw switch 232 arranged to route a single feedback or calibration signal from the coupler structure 225. The function of the calibration signal generation and feedback transceiver circuitry 240 is to connect the feedback point to the respective coupler path under calibration measurement and in the cases of the example embodiments described herein a means for the detection of logical channel to antenna feed.

For receive calibration the calibration signal generation and feedback transceiver circuitry are arranged to up-convert a logical channel calibration signal to the frequency of operation of the receiver under measurement.

For transmit operation, the calibration signal generation and feedback transceiver circuitry are arranged to down-convert to a baseband logical channel from an RF signal, for example an RF signal under test of the transmitter. Advantageously, much of the feedback or signal generation is common, thereby minimising any impact to measurement results. In one example, the assigning of the programming of the switch feedback to antenna element feed selection may be defined apriori. As such, in this manner, the programmed value to the switch matrix selection of the antenna feed port selected may be already known.

An antenna feed for the example embodiments described herein may be a transmission line conductor to transfer signal to or from an antenna element. The transmission line may include a transmission line coupler for the sensing or inserting of a signal as described in the example embodiments described herein.

A coupler may be defined as a device having a minimum of three ports, two through ports and at least one coupled port. The through ports connect the transceiver to or from the antenna element. The at least one third (coupled) port has a signal that is a proportion of the signal present on at least one of the through ports.

It will be appreciated by skilled artisans that different receive and transmit architectures can be employed, such as those involving digital down conversion and digital up conversion stages.

Figure 3:
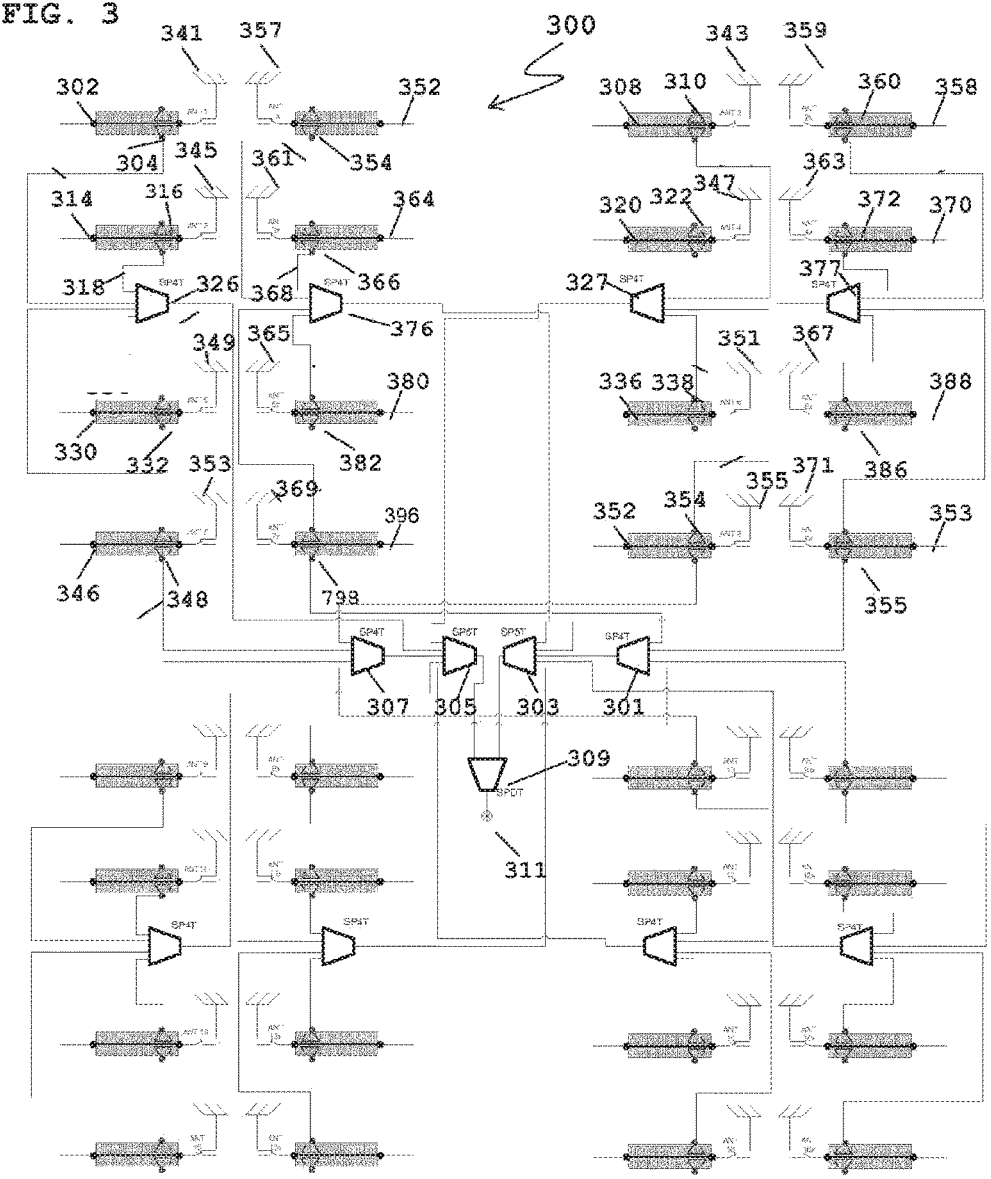
FIG. 3 illustrates an example of a coupler structure.

Referring now to FIG. 3, a more detailed example of a switched coupler structure 300 utilized in calibrating, or used for the database assignment of logical channel to antenna element feed of a beam-form antenna array, is illustrated in accordance with the network element example embodiment of FIG. 2. The example coupler structure 300 of FIG. 3 comprises an antenna array containing sixteen cross polarised antenna elements of two columns and eight rows, each element with a coupled feedback structure connected through a plurality of switch devices to a common feedback point for all antennas and all polarisation types.

Thirty two transceivers ports are illustrated of the coupler structure of FIG. 3. For simplicity purposes only top half of the antenna coupler array sections will be described. It will be appreciated that the symmetric nature does not warrant further description. Sixteen XPOL antenna element pairs are utilised in the antenna array. The antenna elements comprise of sixteen elements of −45° polarisation 341, 343, 345, 347, 349, 351, 353, 355 and sixteen elements of +45° polarisation 357, 359, 361, 363, 365, 367, 369, 371. Each antenna element of both polarisation types is individually operably coupled to a first feed port of a respective coupler structure 304, 354, 360, 310, 316, 366, 322, 372, 332, 382, 338, 386, 348, 398, 354, 798. Thirty two transceiver ports 302, 352, 308, 358, 314, 364, 320, 370, 330, 380, 336, 388, 346, 396, 352, 353 are also each individually operably coupled to a second port of the respective coupler structures 304, 354, 360, 310, 316, 366, 322, 372, 332, 382, 338, 386, 348, 398, 354, 798. Each transceiver port 302, 352, 308, 358, 314, 364, 320, 370, 330, 380, 336, 388, 346, 396, 352, 353 is also operably coupled to a respective transceiver port on the transceiver array in the communications element, for example transceiver arrays 230, 250 in FIG. 2. Sixteen transceiver ports 302, 352, 308, 358, 314, 364, 320, 370, 330, 380, 336, 388, 346, 396, 352, 353 are operably coupled to transceiver array 230 and another sixteen transceiver ports are operably coupled to transceiver array 250. Transceiver array 230 processes signals of antenna elements of −45° polarisation 341, 343, 345, 347, 349, 351, 353, 355 whereas transceiver array 250 processes antenna elements of +45° polarisation 357, 359, 361, 363, 365, 367, 369, 371. Coupler structures 304, 354, 360, 310, 316, 366, 322, 372, 332, 382, 338, 386, 348, 398, 354, 798 have two couple ports, of which a minimum of one couple port is operably coupled to switch network 326, 327, 307, 301, 376, 377, 303, 305. Each coupler corresponds to a feed point to at least one antenna element of the antenna array. Each coupler signal is representative of an antenna element feed that is utilised by the algorithm described herein to map to logical channel assignments.

The switched feedback network allows the calibration signal generation and calibration feedback detection transceiver circuitry 240 to operably couple to a single respective coupler structure port at a particular instant of time. The calibration signal generation and calibration feedback detection transceiver circuitry 240 is operably connected to the switched network output port 311.

The operation of the switched coupler structure 300 of FIG. 3 may be better understood when considering the following example signal flows.

For example, a signal on Ant3 345 can be coupled back/through coupler structure 316 to a switch port 318. The switch 326 can be selected to output/input this coupled signal to switch 305. The switch 305 can input/output this signal to the single-pole double-throw (SPDT) switch 309, whose output port may be operably coupled to calibration signal generation and calibration feedback detection transceiver circuitry 240 of FIG. 2.

Using the example coupler structure and/or a signal processor in a network element that processes logical channels, a mechanism is provided to enable automated detection of unconnected antenna elements, for example following applying, detecting and assigning steps (as described herein) being performed automatically in detecting a routing configuration between the antenna arrangement and a plurality of logical channels. In some examples, unconnected elements or channels may be determined by either failing to detect a second (RF) signal on any antenna element feed after applying a logical signal to a plurality of logical channels; and in response thereto identifying the at least one first logical channel as being unconnected to any antenna element feed; or failing to detect a first (logical) signal on any logical channel after applying a radio frequency signal to at least one first antenna element feed; and in response thereto identifying the at least one first antenna element feed as being unconnected to any logical channel. In some examples, in response to identifying the at least one first logical channel as being unconnected to any antenna element feed, or in response to identifying the at least one first antenna element feed as being unconnected to any logical channel, implementing at least one of: a re-configuration routine of the antenna array; raising an alarm associated with the identified at least one first logical channel or the identified at least one first antenna element feed; reporting of a failure. In some examples, the herein described mechanism may be used to support detection of antenna array size and shape and/or detection of non-functional paths (for example support detection of array element failure detection and correction processes).

Thus, in this manner, the system control device together with the switched coupler network may support, assigning of logical radio paths to physical paths, for example by routing of different signals between logical channels and to/from respective antenna elements, for example within an antenna array. The respective antenna paths can be calibrated separately to determine absolute process path delays, phase response and amplitude response of signal processing path feeds to the antenna elements. In transmit mode, when only the logical channel is excited with a pilot signal at any one time, the calibration feedback path may be used to determine the excited path. In the case of receive mode assigning of physical antenna feeds to logical channels a logical channel is up-converted and is applied to one antenna element and the receive logical channel is checked to determine the excited path.

The term 'converted signal' for the purpose of example embodiments described herein may contain any up-conversion process, down-conversion process, digital to analog conversion process, analog to digital signal processing process, power amplification process or switching process.

Figure 4:
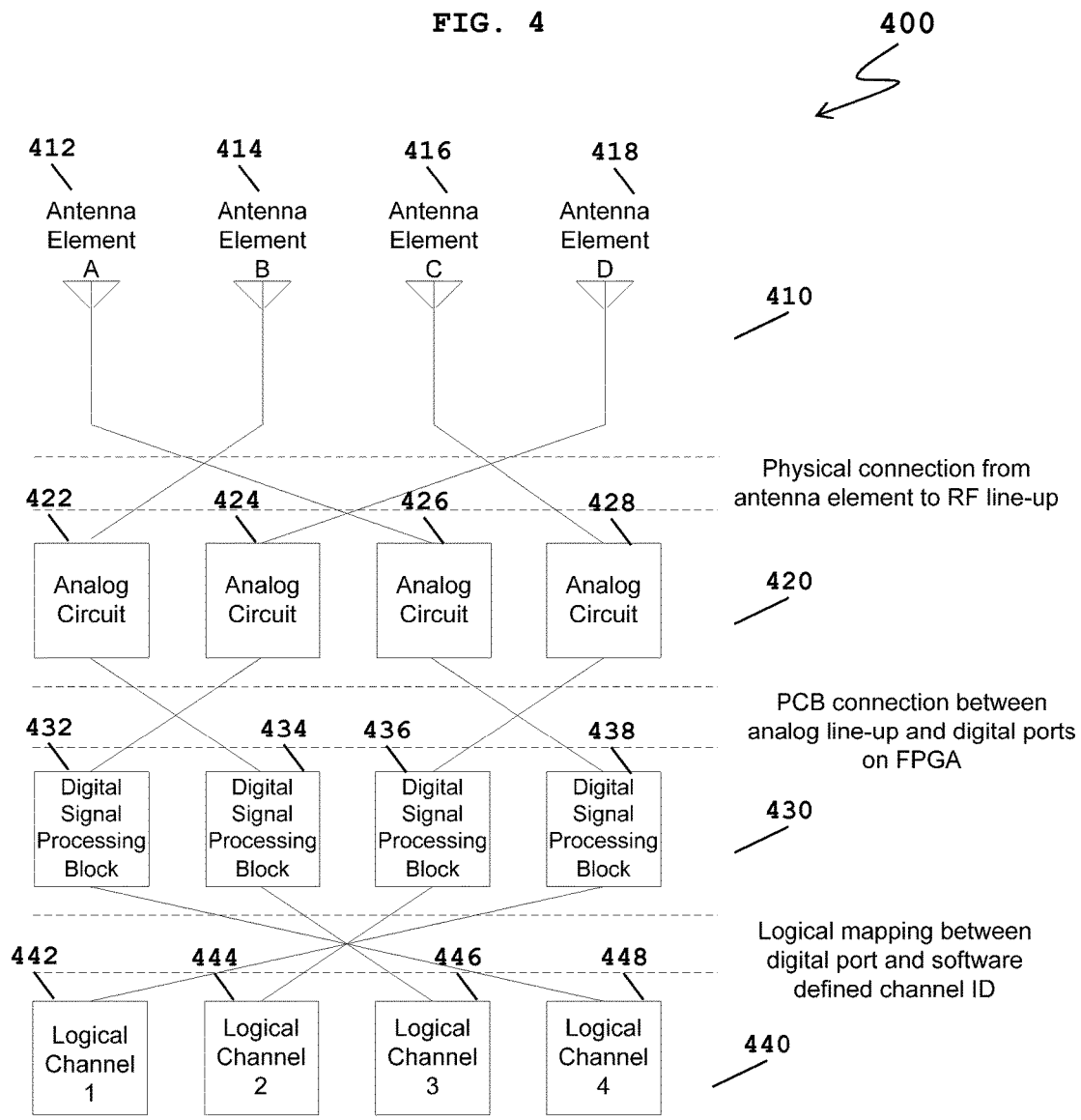
FIG. 4 illustrates an example of a part of a communication unit arranged to support multiple typical connections in an antenna array.

FIG. 4 illustrates an example of a part of a communication unit 400 arranged to support multiple typical connections in an active antenna array 410. The antenna array 410 comprises multiple antenna elements (with four antenna elements shown for clarity purposes only) 412, 414, 416, 418. The respective antenna elements 412, 414, 416, 418 are each connected to a respective one of a plurality 420 of respective analog circuits 422, 424, 426, 428. Each connection is illustrated as a physical connection from the antenna element to a radio frequency circuitry line-up. The respective analog circuits 422, 424, 426, 428 are each connected to a respective one of a plurality 430 of respective digital signal processing blocks 432, 434, 436, 438. Each connection is illustrated as a printed circuit board (PCB) connection between the analog circuit and a digital processor, for example on a field programmable gate array (FPGA). The respective digital signal processing blocks 432, 434, 436, 438 are each connected to a respective one of a plurality 440 of respective logical channels 442, 444, 446, 448. Each connection is illustrated as a logical assigning between a digital port and a software defined channel identifier (ID). In one example, a software routine may be performed to determine a connection between the respective physical elements and logical channels. The software routine may store in memory the assigning of logical channel to element routing during or following the running of a detection algorithm, for example as described with respect to FIG. 6 or FIG. 7.

Thus, in this manner, a logical channel assignment to each of a plurality of transceivers is described. Furthermore, a logical channel to beamform coefficient assignment may be determined for the antenna array.

Figure 6:
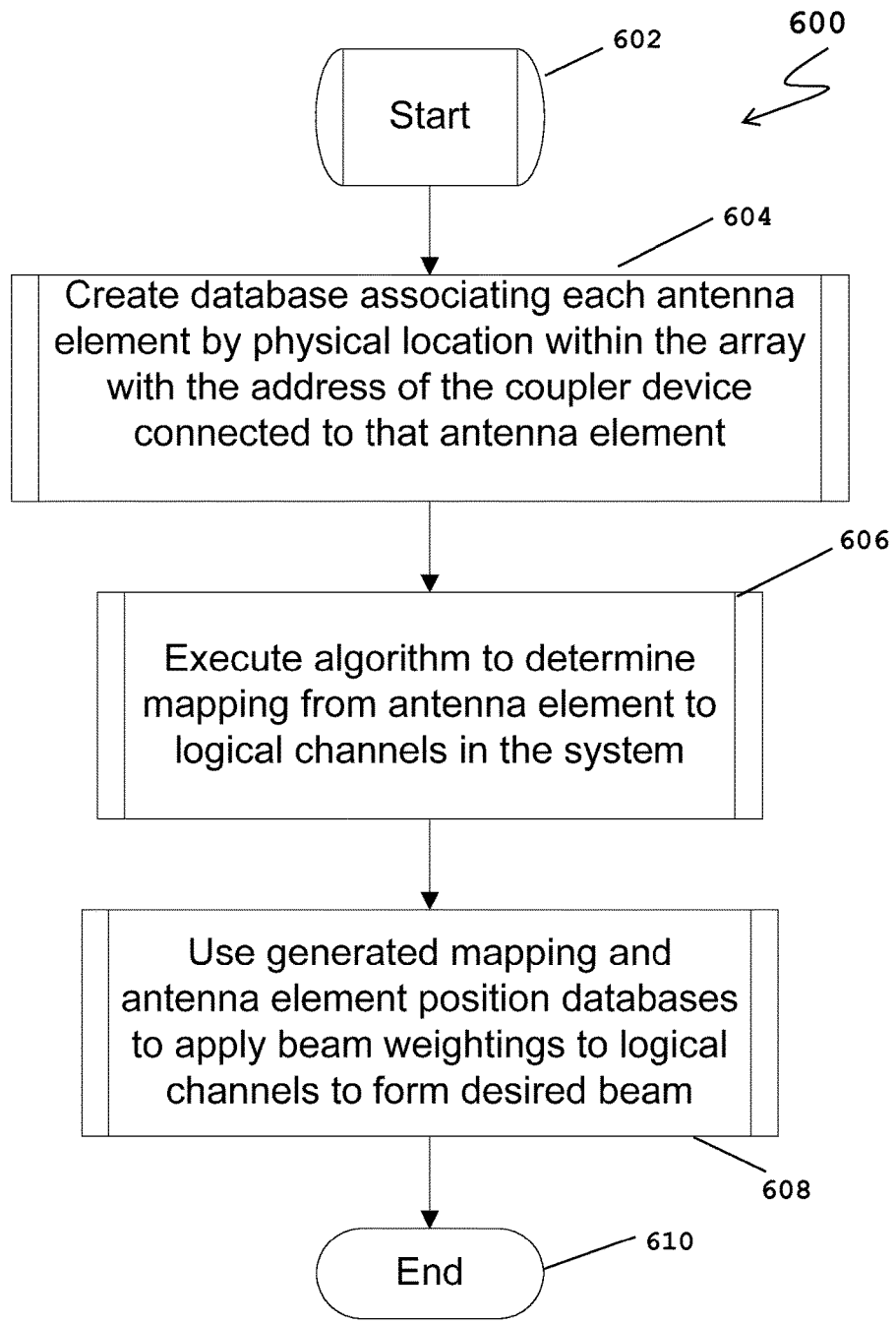
FIG. 6 illustrates an example of a flowchart for acquiring and using assignment data.
Figure 7:
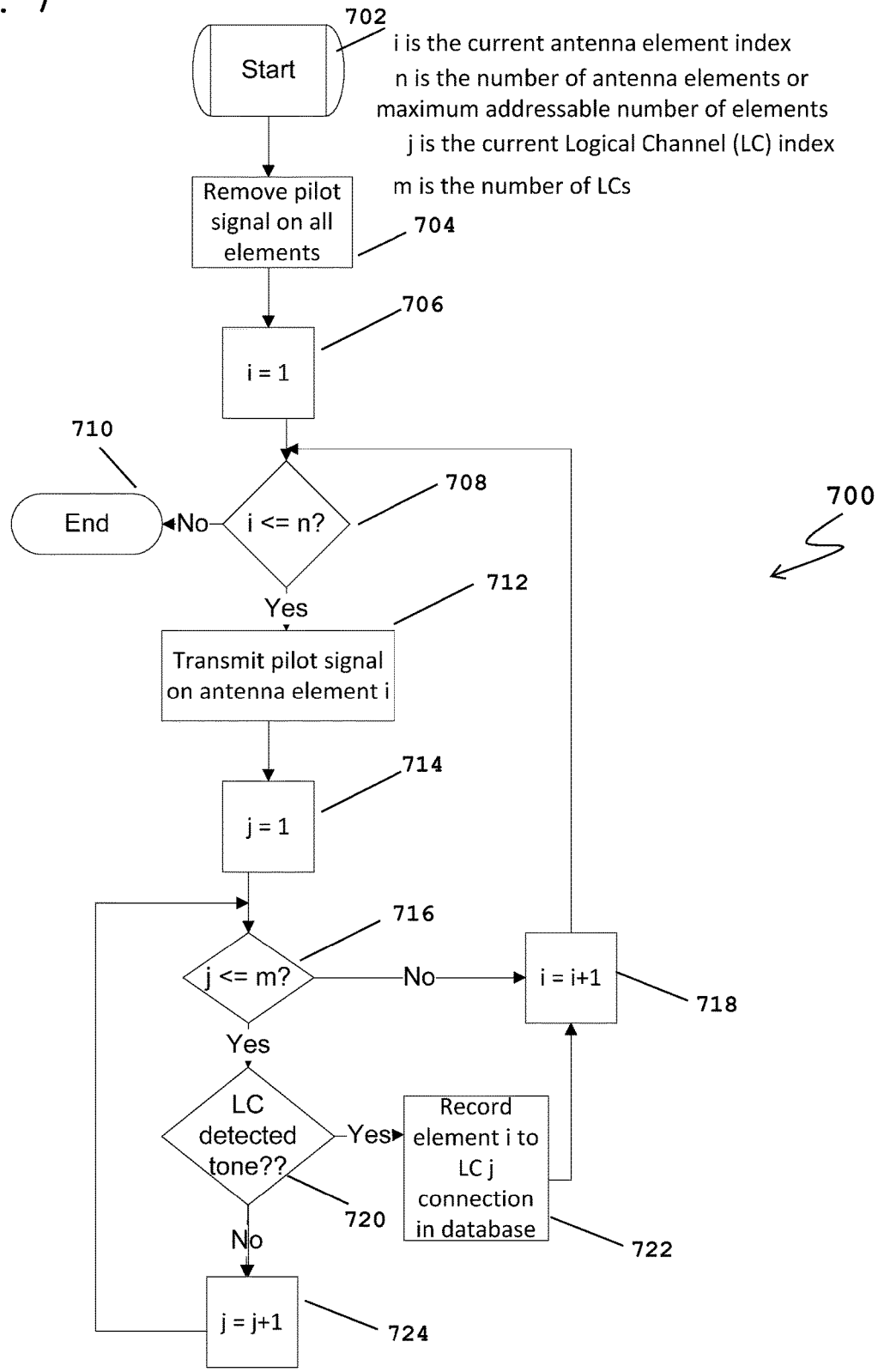
FIG. 7 illustrates an example of a flowchart for automatic active antenna array assigning.

In this manner, an active antenna array with a plurality of antenna elements and a plurality of logically assigned data channels can be configured. In some examples, a software routine may determine the various connections of elements in FIG. 4, and assign a physical channel of each of the plurality of logically assigned data channels by selecting to enable just one logical path to the antenna array. In one example, the software routine may sequentially observe a feedback path to determine logical-to-physical routing, as shown in the flowcharts of FIG. 6 and FIG. 7. A logic to physical routing determination can be made by for example by observing the power in the feedback path using, say, algorithmic means. In some examples, this algorithm may be as simple as a processing of the square of the 'I' sample and the square of the 'Q' sample added together, which would indicate the instantaneous power squared in the feedback signal. A predefined threshold on the power squared signal may be selected to determine if the power received exceeds that for a positive logical channel to antenna element assigning. In another example, a pilot signal may be inserted on the logical channel and a determination made as to whether the pilot signal unique identifier was detected on any of the feedback points.

Figure 5:
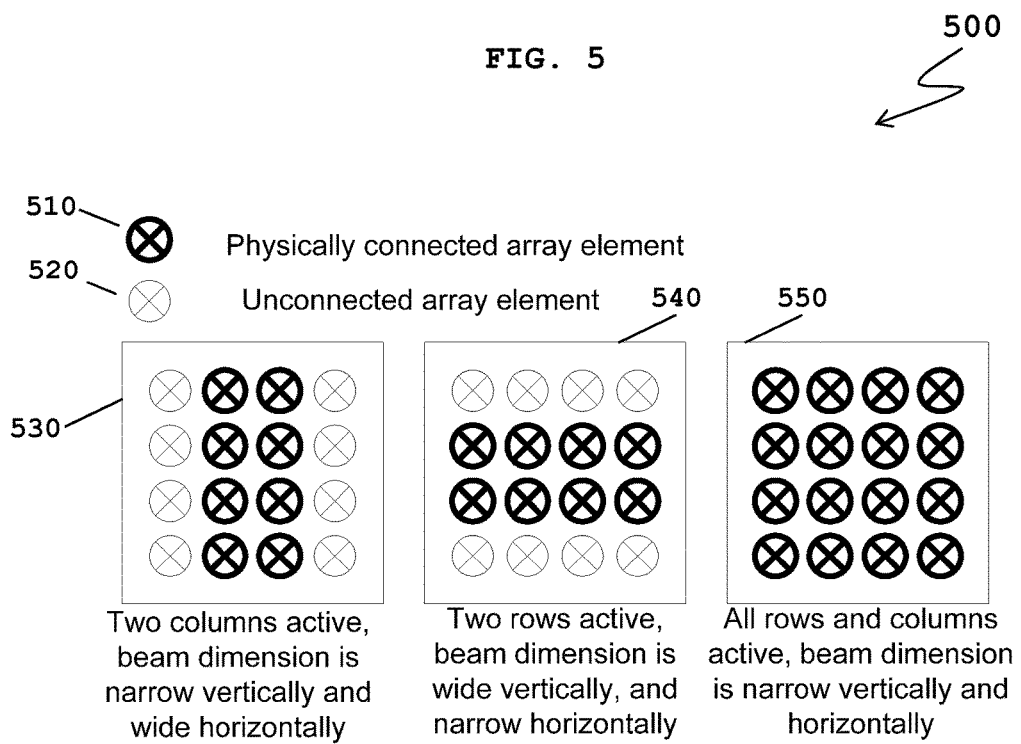
FIG. 5 illustrates an example of array shapes possible in a 4×4 array and their use in beamforming.

In some examples, upon assigning in the database the relationships between a plurality of antenna element feeds and a plurality of logical channels, examples of the invention may further determine at least one of: an array size for an antenna array, an array shape for the antenna array. Upon determining at least one of: an array size for an antenna array, an array shape for the antenna array, examples of the invention may further configure or re-configure the antenna arrangement as a particular array shape in response thereto. For example, FIG. 5 illustrates a number of examples 500 of array shapes possible in a 4×4 array, and their subsequent use in beam-forming. The examples 500 illustrate physically connected array elements 510 and unconnected array elements 520. A first array shape 530 illustrates two columns each of four antenna elements as being active, where the beam dimension is narrow vertically and wide horizontally. A second array shape 540 illustrates two rows each of four antenna elements as being active, where the beam dimension is wide vertically and narrow horizontally. A third array shape 550 illustrates all rows and all columns, each of four antenna elements as being active, where the beam dimension is narrow vertically and narrow horizontally.

Thus, in this manner, an active antenna array with a plurality of antenna elements and a plurality of logically assigned data channels can be configured. In some examples, a software routine may automatically determine a possible antenna array size by sequencing through available logic channels of elements of FIG. 4, and assign a physical channel of each of the plurality of logically assigned data channels to enable just one logical path to the antenna array. In one example, the software routine may sequentially observe a feedback path to determine logical-to-physical routing of the configured paths of FIG. 5, as shown in the flowcharts of FIG. 6 and FIG. 7.

Referring now to FIG. 6, a flowchart 600 provides one example method for acquiring and using assigning data, for example extracted from a database. In one example, the assigning information may be used to apply beam weightings to logical channels in order to form a desired beam of the antenna arrangement. The flowchart commences in 602 with an acquiring and using assigning data operation. In 604, a database is created that associates each antenna element by a physical location within the array with an address of a coupler device connected to that antenna element. An algorithm is then executed in 606 to determine assignment(s) from the antenna element to one or more logical channels in the system. The generated assignment(s) together with the physical location of the antenna element within the array, from the database, are then used to apply beam weightings to logical channels in order to form a desired beam, as shown in 608. The process then ends at 610.

The database in one example embodiment may be stored in non-volatile memory. In one example, this could be flash memory 255 of FIG. 2. In another example embodiment, other memory technologies may be used.

The database as a result may be subsequently used for any reassigned beam shape defined thereafter, without a need for the algorithm to be run for example by deploying in field trials.

Referring now to FIG. 7, a flowchart 700 provides one example method for automatic antenna array assigning. The flowchart commences in 702. In 704, a pilot signal is removed from all antenna elements, in order to record assigning data of antenna element to radio processing element and logical channel. In 706, the current antenna element index ('i') is set to '1'. A determination is then made in 708 as to whether the current antenna element index ('i') is less than or equal to 'n', the number of antenna elements, or a maximum number of addressable antenna elements where array size determination is also derived. If, in 708, a determination is made that the current antenna element index ('i') is equal to 'n', the number of antenna elements or a maximum number of addressable antenna elements, the process ends in 710.

If, in 708, a determination is made that the current antenna element index CO is not equal to 'n', the number of antenna elements, a transmit pilot signal is applied to the current antenna element index CO in 712. The current logical channel index (T) is set to '1' in 714. A determination is then made in 716 as to whether the current logical channel index (T) is less than or equal to 'm', the number of logical channels. If, in 716, a determination is made that the current logical channel index (T) is equal to 'm', the number of logical channels, the current antenna element index CO is increased by '1' in 718 and the process loops back to 708. If, in 716, a determination is made that the current logical channel index (T) is less than or equal to 'm', the number of logical channels, a determination is made as to whether the pilot signal is detected on the current logical channel (T), as shown in 720. If the pilot signal is detected on the current logical channel (T), in 720, this information is recorded in a database and the current antenna element index CO assigned to the current logical channel (T), in 722. The current antenna element index CO is then increased by '1' and the process loops back to 708.

If, however, no pilot signal is detected on the current logical channel ('j'), in 720, then the current logical channel index ('j') is increased by '1' in 724 and the process loops back to 716.

In other examples, the term 'pilot signal' in the example flowchart of FIG. 7 may be replaced by any desirable/suitable test signal and is not confined to pilot tonal stimuli.

When the process has been completed for each (or a plurality of) antenna element(s), the database may contain a complete assignment of the antenna element to radio processing element assigning. Standard database interrogation methods can then be used to determine:

Which antenna element feeds are routed to which logical channels.

Which logical channels are routed to which antenna element feeds.

Which antenna elements are unconnected.

Which logical channels are unconnected.

Detection of failed physical or logical modes in manufacture or in-service.

Thus, in some examples, a method may comprise, in response to no detection of a presence of the radio frequency signal on at least one first antenna element feed converted from a first (logical) signal: iteratively detecting whether there is a presence of the radio frequency signal on at least one further antenna element feed of a plurality of antenna element feeds; and assigning in a database, in response to a positive detection, a relationship between the at least one first logical channel and the detected at least one further antenna element feed. Similarly, in response to no detection of a presence of a logical signal on at least one first logical channel: it may be possible to iteratively detect whether there is a presence of the logical signal on at least one further logical channel of a plurality of logical channels; and assign in the database, in response to a positive detection, a relationship between the at least one first antenna element feed and the detected at least one further logical channel.

In some examples, the stepping process may comprise a feature to 'jump' logical channels that have already been determined as being connected to another antenna element, thereby reducing the number of detection steps.

In this manner, examples of the invention, may support/enable a dynamic build configuration (or build re-configuration) of an AAS platform in terms of which antenna elements are connected to which signal paths. Such examples thereby allow, inter alia, more freedom in final assembly or configuration to as how AAS cable and logical channel routing is accomplished. Furthermore, in contrast to known AAS platforms, there is no longer a need for the connections to be fixed.

In this manner, examples of the invention may solve a problem in known AAS platforms, whereby if an error exists in a hook-up of signal paths to antenna elements or logical channel mis-assignments in systems, an algorithm operating in accordance with FIG. 6 or FIG. 7 may identify the error and thereby enable the mis-assignment to be corrected. Thus, the AAS platform may carry an improved performance in terms of beam-forming capability as the wrong phase and amplitude beam-steering coefficient could not be assigned to an incorrect antenna element.

In some examples, the same software program/configuration routine may be used for every build standard of AAS, whereby the software program automatically detects the routing configuration.

In some examples, if certain paths were unconnected to a logical channel path due to poor assembly, the software program/configuration routine finds the error and highlights those antenna elements/logical channel path(s) that is/are unconnected, thereby facilitating faster debug. In some examples, this may also form part of a self-test routine for an AAS platform.

In some examples, a generic Array control model, once programmed with address information for each antenna element, may be capable of determining an array size for an antenna array, and thereafter configuring the antenna array for a particular mode of operation. For example, allows for detection of array size and shape, e.g. for an array of 4×4 antenna elements, the physical connections may allow a certain limited set of useful array shapes. The shape of the beams which can be generated depends on the array size and shape as shown in In some examples, a determination of unconnected antenna elements to any radio path (for example an antenna element that is not connected to any radio line-up) may be made. Such a determination facilitates in-service detection of line-up failures, which can be used to implement 'soft fail' re-configuration routines plus instigate associated alarm reporting of failures.

In some examples, the architecture and associated software program may allow for array re-configuration, for example in the event that a purpose of the AAS changes, e.g. to support different multiple-in multiple-out (MIMO) set-ups.

Figure 8:
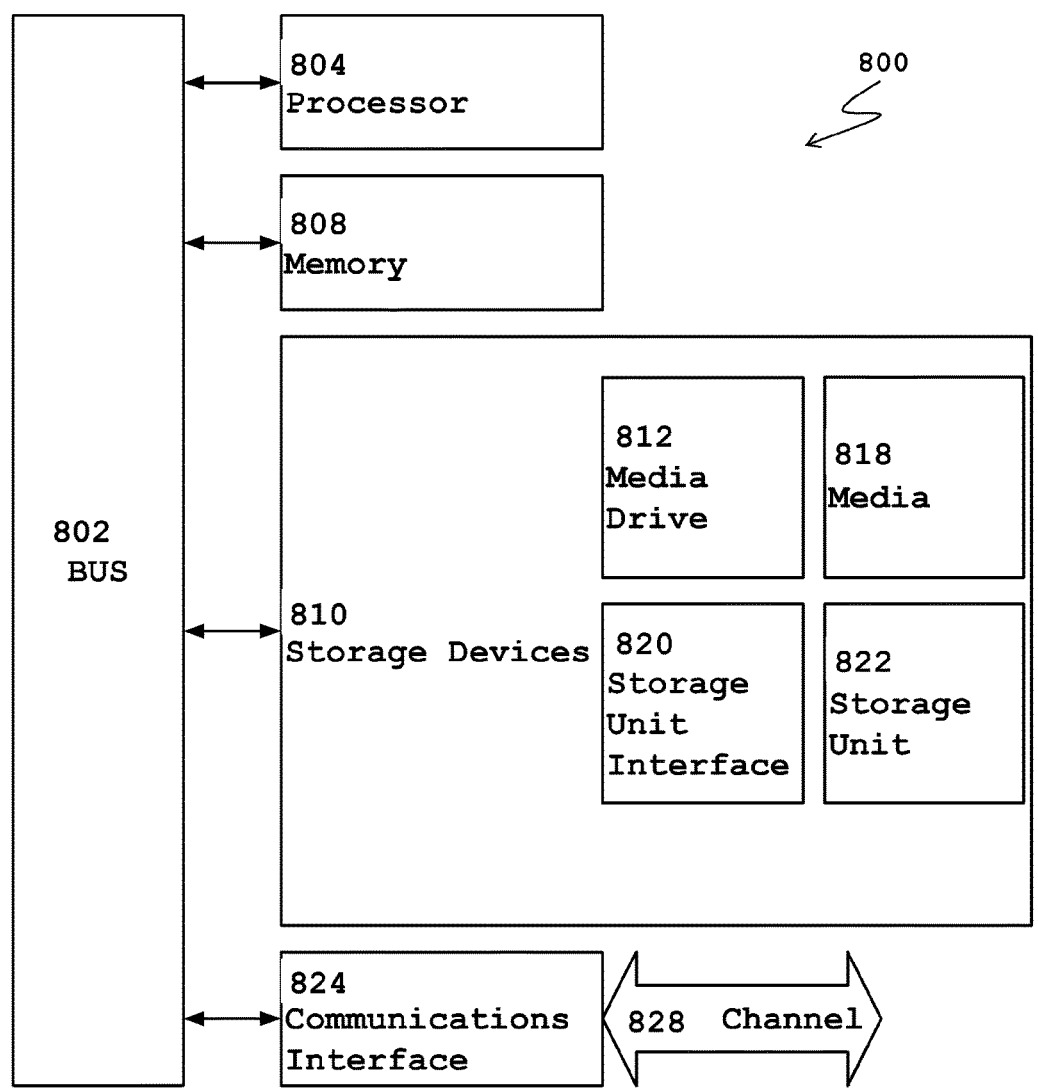
FIG. 8 illustrates a typical computing system that may be employed to implement signal processing functionality in embodiments of the invention.

Referring now to FIG. 8, there is illustrated a typical computing system 800 that may be employed to implement signal processing functionality in embodiments of the invention. Computing systems of this type may be used in network elements/wireless communication units. In some examples, the computer program and storage media may be located in the cloud or somewhere in the network of the operator environment, for example at an Operations and Management Centre (OMC). Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method of determining a relationship between at least one logical channel of a plurality of logical channels and at least one antenna element feed of a plurality of antenna element feeds coupleable to an antenna array, the method comprising:
    applying a first signal generated by a network element to a logical channel of the plurality of logical channels;
    detecting a presence of a receive signal at an antenna element feed of the plurality of antenna element feeds using a coupler structure, wherein the receive signal is a radio frequency signal generated based on the first signal, wherein the antenna element feed is coupled between the logical channel and an antenna element of the antenna array; and
    determining, without prior knowledge of a specifically defined connection of the logical channel to the antenna element feed, a mapping based on said detecting, wherein the mapping indicates a connection between the logical channel and the antenna element feed.

2. The method claim 1, further comprising:
    determining that a different logical channel of the plurality of logical channels is also mapped to the antenna element feed; and in response to said determining, storing data indicating that the different logical channel is mapped to the antenna element feed.

3. The method claim 1, further comprising:
determining that the first signal is present on a circuit element in a physical channel between the logical channel and the antenna element feed; and
in response to said determining, storing data indicating that the circuit element is mapped to at least one of the logical channel or the antenna element feed.

4. The method claim 1, further comprising applying a beam weighting to the logical channel based at least partly on the mapping.

5. The method claim 1, wherein the antenna array includes at least one cross polarized patch antenna element.

6. The method claim 1, further comprising:
determining an absolute position of one or more antenna elements of the antenna array based at least partially on the mapping; and
determining an array shape of the antenna array based at least partly on the absolute position.

7. The method of claim 6, further comprising:
determining an absolute position of one or more antenna elements of an antenna array based at least partially on the mapping; and
reconfiguring a shape of the antenna array based at least on the absolute position.

8. The method claim 1, further comprising at least one of:
determining that a different logical channel of the plurality of logical channels is unconnected to any antenna element feed of the plurality of antenna element feeds; or
determining that a different antenna element feed of the plurality of antenna element feeds is unconnected to any logical channel of the plurality of logical channels.

9. The method claim 1, further comprising determining an absolute position of one or more antenna elements the antenna array based at least partly on the mapping.

10. A computer program product comprising code stored on non-transitory memory that, when executed by a processor, causes the method of claim 1 to be performed by the network element.

11. A network element comprising:
a plurality of logical channels;
a plurality of antenna element feeds connectable to the plurality of logical channels; and
a signal processor comprising circuitry configured to:
apply a first signal to a logical channel of the plurality of logical channels;
detect a presence of a receive signal at an antenna element feed of the plurality of antenna element feeds using a coupler structure, wherein the receive signal is a radio frequency signal generated based on the first signal, wherein the antenna element feed is coupled between the logical channel and an antenna element;
determine, without prior knowledge of a specifically defined connection of the logical channel to the antenna element feed, a mapping indicating that the logical channel is connected to the antenna element feed based on detecting the receive signal at the antenna element feed using the coupler structure; and
store data indicating that the logical channel is connected to the antenna element feed.

12. The network element of claim 11, wherein the signal processor is further configured to apply a beam weighting to the logical channel based at least partly on the stored data.

13. The network element of claim 11, wherein the signal processor comprises calibration signal generation and calibration feedback detection transceiver circuitry.

14. The network element of claim 11, wherein the signal processor is further configured to transmit a second signal though a signal path between the logical channel and the antenna element feed.

15. The network element of claim 11, further comprising switch devices arranged to electrically connect the coupler structure to a common feedback point for antenna elements of an antenna array, the antenna elements including the antenna element.

16. The network element of claim 11, wherein a digital signal processing block and an analog circuit are electrically connected between the logical channel and the antenna element.

17. A network element comprising:
a plurality of logical channels;
a plurality of antenna element feeds connectable to the plurality of logical channels; and
a signal processor comprising circuitry configured to:
apply a first signal to an antenna element feed of the plurality of antenna element feeds using a coupler structure, wherein the antenna element feed is coupled between an antenna element and a logical channel of the plurality of logical channels;
detect a presence of a receive signal at the logical channel, wherein the receive signal is a logical signal generated based on the first signal;
determine, without prior knowledge of a specifically defined connection of the logical channel to the antenna element feed, a mapping indicating that the logical channel is connected to the antenna element feed based on detecting the receive signal at the logical channel; and
store data indicating that the logical channel is connected to the antenna element feed.

18. The network element of claim 17, further comprising an antenna array that includes the antenna element, wherein the antenna array includes at least one cross polarized patch antenna element.

19. The network element of claim 18, wherein the signal processor is further configured to:
determine an absolute position of one or more antenna elements of the antenna array based at least partially on the mapping; and
determine an array shape of the antenna array based at least partly on the determined absolute position.

20. The network element of claim 17, wherein the signal processor comprises calibration signal generation and calibration feedback detection transceiver circuitry.

21. The network element of claim 17, further comprising switches arranged to electrically connect the coupler structure to a common network port associated with the plurality of antenna element feeds.

22. A method of determining a relationship between at least one logical channel of a plurality of logical channels and at least one antenna element feed of a plurality of antenna element feeds coupleable to an antenna array, the method comprising:
applying a first signal to an antenna element feed of the plurality of antenna element feeds using a coupler structure, wherein the antenna element feed is coupled between an antenna element of the antenna array and a logical channel of the plurality of logical channels;

detecting a presence of a receive signal at the logical channel, wherein the receive signal is a logical signal generated based on the first signal;

determining, without prior knowledge of a specifically defined connection of the logical channel to the antenna element feed, a mapping based on said detecting, wherein the mapping indicates that the logical channel is connected to the antenna element feed; and storing data indicating that the logical channel is connected to the antenna element feed.

23. The method claim 22, wherein the first signal includes a transmit pilot signal, wherein the antenna array includes at least one cross polarized patch antenna element.

24. The method claim 22, further comprising:

determining an absolute position of one or more antenna elements of the antenna array based at least partially on the mapping; and determining an array shape of the antenna array based at least partly on the absolute position.

25. The method claim 22, further comprising removing the first signal from all of the plurality of antenna element feeds prior to the applying such that the applying comprises applying the first signal to only the antenna element feed of the plurality of antenna element feeds.

* * * * *

UNITED STATES PATENT AND TRADEMARK OFFICE
CERTIFICATE OF CORRECTION

PATENT NO. : 10,003,413 B2
APPLICATION NO. : 14/897602
DATED : June 19, 2018
INVENTOR(S) : Conor O'Keeffe et al.

It is certified that error appears in the above-identified patent and that said Letters Patent is hereby corrected as shown below:

On the Title Page

Item (*), Line 3, change "0 days. days." to --0 days.--

In the Specification

Column 9, Line 1, change "and or" to --and/or--

Column 9, Line 39, change "T" to --'j'--

Column 14, Line 44, change "CO" to --('i')--

Column 14, Line 46, change "CO" to --('i')--

Column 14, Line 47, change "(T)" to --('j')--

Column 14, Line 49, change "(T)" to --('j')--

Column 14, Line 51, change "(T)" to --('j')--

Column 14, Line 52, change "CO" to --('i')--

Column 14, Line 55, change "(T)" to --('j')--

Column 14, Line 57, change "(T)," to --('j'),--

Column 14, Line 59, change "(T)," to --('j'),--

Column 14, Line 60, change "CO" to --('i')--

Signed and Sealed this
Twenty-second Day of January, 2019

Andrei Iancu
*Director of the United States Patent and Trademark Office*

CERTIFICATE OF CORRECTION (continued)
U.S. Pat. No. 10,003,413 B2

Column 14, Line 61, change "(T)," to --('j'),--

Column 14, Line 62, change "CO" to --('i')--

Column 17, Lines 33-34, change "product' computer-" to --product', 'computer- --

In the Claims

Column 18, Line 64, Claim 2, change "method claim" to --method of claim--

Column 19, Line 4, Claim 3, change "method claim" to --method of claim--

Column 19, Line 11, Claim 4, change "method claim" to --method of claim--

Column 19, Line 14, Claim 5, change "method claim" to --method of claim--

Column 19, Line 16, Claim 6, change "method claim" to --method of claim--

Column 19, Line 28, Claim 8, change "method claim" to --method of claim--

Column 19, Line 36, Claim 9, change "method claim" to --method of claim--

Column 19, Line 37, Claim 9, change "elements the" to --elements of the--

Column 21, Line 11, Claim 23, change "method claim" to --method of claim--

Column 21, Line 14, Claim 24, change "method claim" to --method of claim--

Column 21, Line 20, Claim 25, change "method claim" to --method of claim--